United States Patent
Suwald

(10) Patent No.: US 9,317,675 B2
(45) Date of Patent: Apr. 19, 2016

(54) SMARTCARD, SMARTCARD SYSTEM AND METHOD FOR CONFIGURING A SMARTCARD

(71) Applicant: NXP B.V., Eindhoven (DE)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/187,281

(22) Filed: Feb. 23, 2014

(65) Prior Publication Data

US 2014/0289844 A1  Sep. 25, 2014

(30) Foreign Application Priority Data

Mar. 19, 2013  (EP) ..................... 13159902

(51) Int. Cl.
| | | |
|---|---|---|
| *G06F 21/00* | (2013.01) | |
| *G06F 21/34* | (2013.01) | |
| *G06K 19/07* | (2006.01) | |
| *G07F 7/10* | (2006.01) | |
| *G06Q 20/34* | (2012.01) | |

(52) U.S. Cl.
CPC ............ *G06F 21/34* (2013.01); *G06K 19/0719* (2013.01); *G06Q 20/355* (2013.01); *G07F 7/10* (2013.01)

(58) Field of Classification Search
CPC ............... G06F 21/34; G04K 19/0719; G06Q 20/3574; G06Q 20/355; G07F 7/10
USPC ......................................................... 726/20
See application file for complete search history.

(56) References Cited

U.S. PATENT DOCUMENTS

| | | | |
|---|---|---|---|
| 5,590,038 A | 12/1996 | Pitroda | |
| 7,270,276 B2 | 9/2007 | Vayssiere | |
| 7,594,611 B1 | 9/2009 | Arrington, III | |
| 7,954,708 B2 | 6/2011 | Blossom | |
| 2004/0123152 A1* | 6/2004 | Le Saint ........................ | 713/201 |
| 2006/0065741 A1* | 3/2006 | Vayssiere ...................... | 235/492 |
| 2007/0145132 A1 | 6/2007 | Minemura | |
| 2008/0129450 A1 | 6/2008 | Riegebauer | |
| 2009/0143104 A1* | 6/2009 | Loh et al. ...................... | 455/558 |
| 2012/0204240 A1 | 8/2012 | Barbe et al. | |
| 2013/0086389 A1 | 4/2013 | Suwald | |
| 2014/0091815 A1 | 4/2014 | Suwald | |
| 2014/0152610 A1 | 6/2014 | Suwald | |

FOREIGN PATENT DOCUMENTS

| | | |
|---|---|---|
| EP | 1 487 170 A2 | 12/2004 |
| EP | 12187015.8 | 10/2012 |
| EP | 2 575 084 A1 | 4/2013 |
| EP | 2 667 156 A1 | 11/2013 |
| WO | 2012/015505 A1 | 11/2012 |

OTHER PUBLICATIONS

Extended European Search Report for Application No. 13159902.9 (Jun. 13, 2013).

* cited by examiner

Primary Examiner — Yogesh Paliwal

(57) ABSTRACT

According to an aspect of the invention, a smartcard is conceived that comprises at least two pre-installed applications and an application user interface selector, wherein said application user interface selector is arranged to select and configure a specific authentication user interface corresponding to a specific one of the pre-installed applications in dependence on encoded information received from a host application.

13 Claims, 5 Drawing Sheets

| | | |
|---|---|---|
| Hash Sum 1 | Writing Decoding Configuration String 1 | User Interface Configuration String 1 |
| Hash Sum 2 | Writing Decoding Configuration String 2 | User Interface Configuration String 2 |
| Hash Sum 3 | Empty | Empty |
| Hash Sum 4 | Writing Decoding Configuration String 4 | User Interface Configuration String 4 |

| Hash Sum 1 | Writing Decoding Configuration String 1 | User Interface Configuration String 1 |
| Hash Sum 2 | Writing Decoding Configuration String 2 | User Interface Configuration String 2 |
| Hash Sum 3 | Empty | Empty |
| Hash Sum 4 | Writing Decoding Configuration String 4 | User Interface Configuration String 4 |

| User Interface ConfigurationString 1 | Signature | Card Display |
|---|---|---|
| User Interface ConfigurationString 2 | Swipe | No Display |
| User Interface ConfigurationString 3 | Button Press | Host Display |

SMARTCARD, SMARTCARD SYSTEM AND METHOD FOR CONFIGURING A SMARTCARD

CROSS-REFERECE TO RELATED APPLICATIONS

This application claims the priority under 35 U.S.C. §119 of European patent application no. 13159902.9, filed on Mar. 19, 2013, the contents of which are incorporated by reference herein.

FIELD OF THE INVENTION

The invention relates to a smartcard. The invention also relates to a smartcard system. The invention further relates to a method for configuring a smartcard.

BACKGROUND OF THE INVENTION

Nowadays, there are many different smartcards, for example banking cards, access cards, loyalty cards and electronic documents. A card holder may own different cards for many different applications. It may not be very convenient for a card holder to store more than a few cards inside a wallet. Furthermore, storing more than a few cards in a wallet may increase the risk that the cards are mechanically stressed or damaged. Also, it may take an unacceptable amount of time to identify a specific smartcard among a set of smartcards. Therefore, there is a need to provide a single smartcard suitable for different applications.

In order to increase the overall level of security of smartcard systems, user authentication is often requested by smartcard applications. Typically, authentication information is entered through a user interface of a host system, such as a banking terminal, a PC, a laptop or a mobile phone. However, as described in the European patent application titled "Security Token and Authentication System" (application number EP12155351.5, filed on 14 Feb. 2012 by applicant NXP B.V.), which is incorporated herein by reference, authentication information can also be entered through a user interface directly embedded into a smartcard.

If the user interface for entering authentication information is provided on the smartcard, the user convenience will improve. Furthermore, the overall level of security will improve, because the verification of said authentication information can be done on the smartcard instead of on an external device. However, user interfaces for entering authentication information on smartcards have the disadvantage that they are typically designed fir a single application. Therefore, it is difficult to implement such user interfaces on multi application smartcards.

SUMMARY OF THE INVENTION

It is an object of the invention to facilitate the implementation of user interfaces of the kind set forth on multi-application smartcards. This object is achieved by a smartcard as defined in claim 1, a smartcard system as defined in claim 9, and a method for configuring a smartcard as defined in claim 12.

According to an aspect of the invention, a smartcard is conceived that comprises at least two pre-installed applications and an application user interface selector, wherein said application user interface selector is arranged to select and configure a specific authentication user interface corresponding to a specific one of the pre-installed applications in dependence on encoded information received from a host application.

According to an exemplary embodiment of the smartcard, said host application is external to the smartcard.

According to a further exemplary embodiment of the smartcard, the encoded information comprises a hash sum which uniquely identifies the specific authentication user interface.

According to a further exemplary embodiment of the smartcard, the authentication user interface comprises a tactile data decoding unit, and said application user interface selector is further arranged to configure said tactile data decoding unit in dependence on the encoded information received from the host application.

According to a further exemplary embodiment of the smartcard, the tactile data decoding unit is arranged to decode tactile pattern data of at least one of the types of a handwritten character, a button press, a swipe, a keypad entry, a signature and a signature shortcut, and the application user interface selector is arranged to configure the tactile data decoding unit by selecting a specific type of tactile pattern data to be decoded.

According to a further exemplary embodiment of the smartcard, the authentication user interface comprises a user feedback interface, and said application user interface selector is further arranged to configure said user feedback interface in dependence on the encoded information received from the host application.

According to a further exemplary embodiment of the smartcard, the user feedback interface comprises at least one of a display and a light emitting diode, and the application user interface selector is arranged to configure the user feedback interface by activating said display and/or said light emitting diode.

According to a further exemplary embodiment of the smartcard, the user feedback interface comprises a back channel to the host application, and the application user interface selector is arranged to configure the user feedback interface by activating said back channel.

According to a further aspect of the invention, a smartcard system is conceived that comprises a host device coupled to a smartcard reader and a smartcard of the kind set forth, wherein the host device is arranged to execute said host application, wherein, when being executed by the host device, the host application generates said encoded information, and wherein the host device is arranged to transmit said encoded information to the smart card via the smartcard reader.

According to an exemplary embodiment of the smart card system, the host application generates said encoded information in response to application-specific encoded information received from the smartcard.

According to a further exemplary embodiment of the smart card system, the application-specific encoded information received from the smartcard is a hash sum generated by the smartcard by applying a hash function on application descriptive data.

According to a further aspect of the invention, a method fur configuring a smartcard comprising at least two pre-installed applications and an application user interface selector is conceived, wherein said application user interface selector selects and configures a specific authentication user interface corresponding to a specific one of the pre-installed applications in dependence on encoded information received from a host application.

According to an exemplary embodiment of the method, said host application is external to the smartcard.

According to a further exemplary embodiment of the method the encoded information comprises a hash sum which uniquely identifies the specific authentication user interface.

BRIEF DESCRIPTION OF THE DRAWINGS

The invention will be described in more detail with reference to the appended drawings, in which.

DESCRIPTION OF EMBODIMENTS

Figure 1:
FIG. 1 shows examples of different smartcards.

FIG. 1 shows examples of different smartcards. The examples clearly illustrate that an average card holder may have to deal with many smartcard applications. Furthermore, many smartcards are still designed for a single application, or at most for a limited number of closely related applications.

Figure 2:
FIG. 2 shows a smartcard comprising a tactile user interface for entering a secret.

FIG. 2 shows a smartcard comprising a tactile user interface for entering a secret. In this example, a handwritten character which represents a digit of a personal identification number (PIN) is entered via the tactile user interface of the smartcard. A smartcard of this kind has been disclosed in the European patent application titled "Security Token and Authentication System." (application number EP12155351.5, filed on 14 Feb. 2012 by applicant NXP B.V.), In particular, the smartcard disclosed therein comprises a tactile user interface configured to receive tactile user input and to process the tactile user input, such that authentication information can be derived from the tactile user input by a tactile pattern decoding process with the purpose of utilizing the decoded information for user authentication towards a host application. As mentioned above, user interfaces for entering authentication information on smartcards have the disadvantage that they are typically designed for a single application. Therefore, it is difficult to implement such user interfaces on multi-application smartcards.

Furthermore, it is difficult to enable variants of user interfaces in order to support, for example, disabled users, Gesture input is better suited for blind people than a keypad user interface. Thus, it would be desirable that, before card issuing, the user may request a specific user interface that satisfies his/her personal needs. The present disclosure enables this by combining application information with user data to enable both the application and a user-specific interface variant. In practice, this means that there will be one subversion of the application for every feasible user interface variant. It is also feasible to block the user interface completely. The use of a hash sum according to the present disclosure is particularly advantageous, because it enables said combining of application information with user data.

Figure 3:
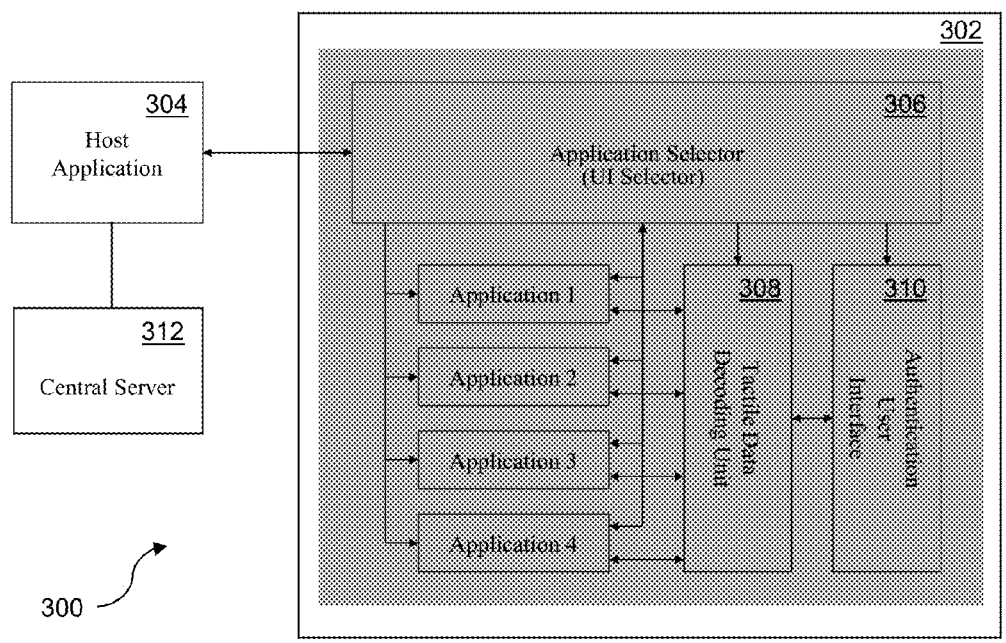
FIG. 3 shows an exemplary embodiment of a smartcard system.

FIG. 3 shows an exemplary embodiment of a smartcard system 300. In order to facilitate the implementation of tactile user interfaces on multi-application smartcards, a smartcard 302 forming part of said smartcard system 300 comprises an application user interface selector 306 which is arranged to select and configure a specific authentication user interface 310 corresponding to a specific pre-installed application in dependence on encoded information received from a host application 304. More specifically, the specific pre-installed application may be an "applet" and the pre-installed application may already have been selected via the so-called "applet select" mechanism specified by the Java Card platform. Thus, the present disclosure may effectively extend this "applet select" mechanism with the selection of an application-specific user interface. In practice, applets are installed by a card issuing authority and once they have been installed they can no longer be modified. Nevertheless, the host application 304 is connected to a server 312 of the card issuing authority, and in accordance with the present disclosure, the card issuing authority may select and configure the user interface of a specific applet via the host application 304.

For example, an electronic identification card application may be activated as soon as the smartcard is attached to a contactless reader device controlled by an electronic identification card host application. More specifically, the following steps may be performed:

1. The host application selects a smartcard application (applet) using the "applet select" mechanism.

2. The selected smartcard application responds with a hash sum that clearly identifies the applet version, in particular the user-specific applet version.

3. The host application sends user interface control information, i.e. another hash sum, to the smartcard applet in accordance with the present disclosure. This provides an option to control the user interface based on updates by the card issuing authority (for example the hank). In this way, the host application is in control of the user interface of the smart card. Besides this, the host application may guide the user interface by displaying help text on the host display, for example.

4. The smartcard's user interface is selected configured accordingly through the application user interface selector 306.

In addition, the smartcard's tactile user input interface may be configured, for example, to receive handwritten numerical characters representing a personal identification number (PIN). Furthermore, a light emitting diode (LED) may be configured to guide the tactile data input process by providing optical feedback to the card holder, for example.

Thus, as shown in FIG. 3, the application user interface selector 306 may evaluate a hash sum being provided by a host application 304 and may activate, depending on the evaluation result, a specific authentication user interface 310 corresponding to the selected. application, which comprises configuration of the tactile user input interface as well as configuration of the user feedback interface. Furthermore, an embedded tactile data decoding unit 308 (for example a handwriting decoding unit) may be configured according to the needs of the selected application, such that different inputs like a button press, entry of a handwritten character, detection of a gesture such as a directed swipe over the card's surface, a. signature shortcut or a complete signature may be detected and decoded.

Figure 4:
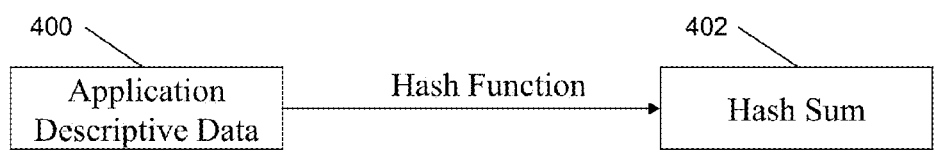
FIG. 4 shows an exemplary embodiment of a hash function.

FIG. 4 shows an exemplary embodiment of a hash function. In particular, it illustrates the generation of an application-specific hash sum 402 by applying a hash function on application descriptive data 400 that uniquely describes a specific application (applet). The hash function is selected such that potential detection collisions are avoided. The hash function is executed by the smart card 302 and the resulting hash sum 402 is sent to the host application 304 through the active smartcard communication interface, for example ISO14443 or ISO7816. Subsequently, the hash sum is decoded by the host application 304. Then, the host application 304 returns a hash sum to the smart card 302 requesting a specific user interface configuration, utilizing a predefined application protocol data unit (APDU) container. Upon identification of the hash sum APDU, the APDU handler in the smartcard operating system identifies the need for hash sum decoding and activates the application user interface selector 306.

Figure 5:
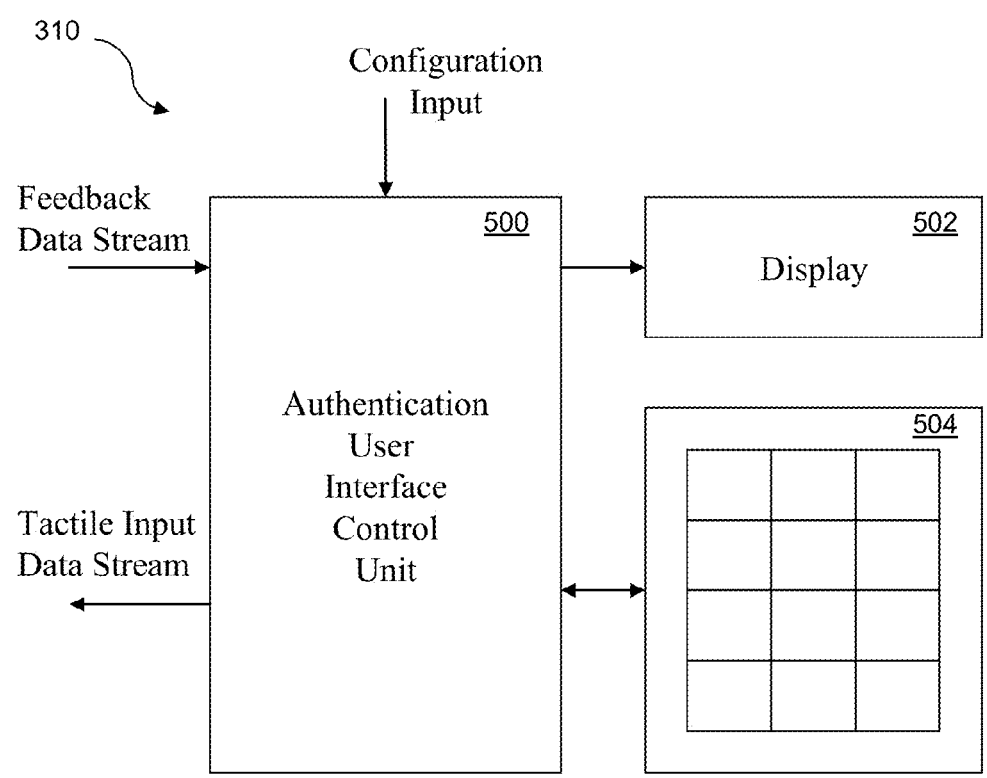
FIG. 5 shows an exemplary embodiment of an authentication user interface.

FIG. 5 shows an exemplary embodiment of an authentication user interface 310 as shown in FIG. 3. The authentication user interface 310 may comprise an embedded smartcard display 502, a tactile user interface 504 that may be a capacitive proximity-based sensor device, and a user interface control unit 500 that processes the user input and output according to an application-specific configuration. The user input is entered via the tactile user interface 504 and processed, which yields a tactile input data stream which may be fed to the tactile data decoding unit 308. A feedback data stream may be processed, which results in an output on the display 502, for example. An example of a tactile user interface 504 which may be used in this authentication user interface 310 is the capacitive proximity-based sensor device described in the European patent application titled "Security Token and Authentication System" (application number EP12155351.5, filed on 14 Feb. 2012 by applicant NXP BN.). A configuration input provided by the application user interface selector 306 determines the application-specific configuration of the processing of the user input and output by the user interface control unit 500. The configuration input may, for example, be embodied as a configuration string, as explained with reference to FIG. 7.

Figures 6, 7:
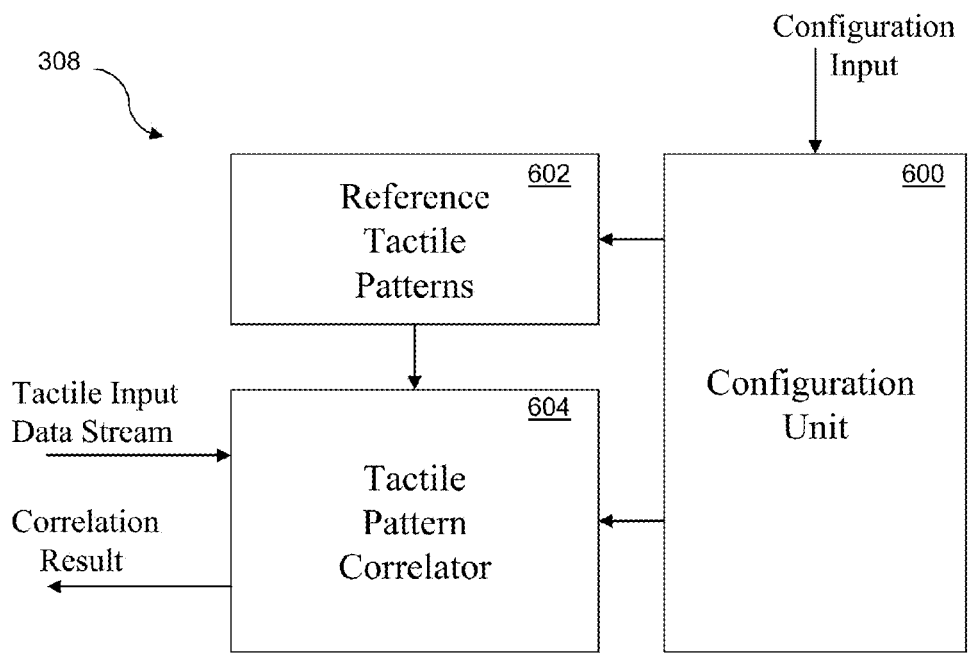
FIG. 6 shows an exemplary embodiment of a tactile data decoding unit.
FIG. 7 shows an exemplary embodiment of a table wherein reference hash sums are linked to specific configuration inputs.

FIG. 6 shows an exemplary embodiment of a tactile data decoding unit 308 as shown in FIG. 3. The tactile data decoding unit 308 may for example be a handwriting decoder. The tactile data decoding unit 308 comprises a configurable storage for tactile reference patterns 602 and a configurable tactile pattern correlator 604. A tactile input data stream received from the authentication user interface 310 may be decoded by the tactile pattern correlator 604 and a corresponding correlation result may be provided to the invoking application for further processing. A configuration unit 600 is arranged to configure the storage for tactile reference patterns 602 and the tactile pattern correlator 604 in dependence on a configuration input provided by the application user interface selector 306. The configuration input may, for example, be embodied as a configuration string, as explained with reference to FIG. 7. In practice, the configuration unit 600 has to ensure that proper reference tactile patterns are loaded from a secure element into a random access memory (RAM). Thus, the configurable storage fir tactile reference patterns 602 may be regarded as a mechanism that identifies the required patterns and configures the secure element to send these patterns to the RAM. The tactile pattern correlator 604 is configured for a specific code alphabet.

FIG. 7 shows an exemplary embodiment of a table wherein reference hash sums are linked to specific configuration inputs. In particular, it shows an example of configuration information linked to reference hash sums with the purpose to configure an authentication user interface 310 and a tactile data decoding unit 308 according to application-specific needs. The reference hash sums are compared, by the application user interface selector 306, with the hash sum received from the host application 304. If the table contains no configuration information linked to a specific hash sum, then the related interface will not be available for the application identified by said hash sum. This is the case for the application identified by "Hash Sum 3". For the application identified by "Hash Sum 1", a configuration input embodied as "Configuration String 1" prescribes that the tactile data decoding unit 308 shall be a handwriting decoder and that the authentication user interface 310 shall be enabled. The same holds for the applications identified by "Hash Sum 2" and "Hash Sum 4".

Figures 8, 9:
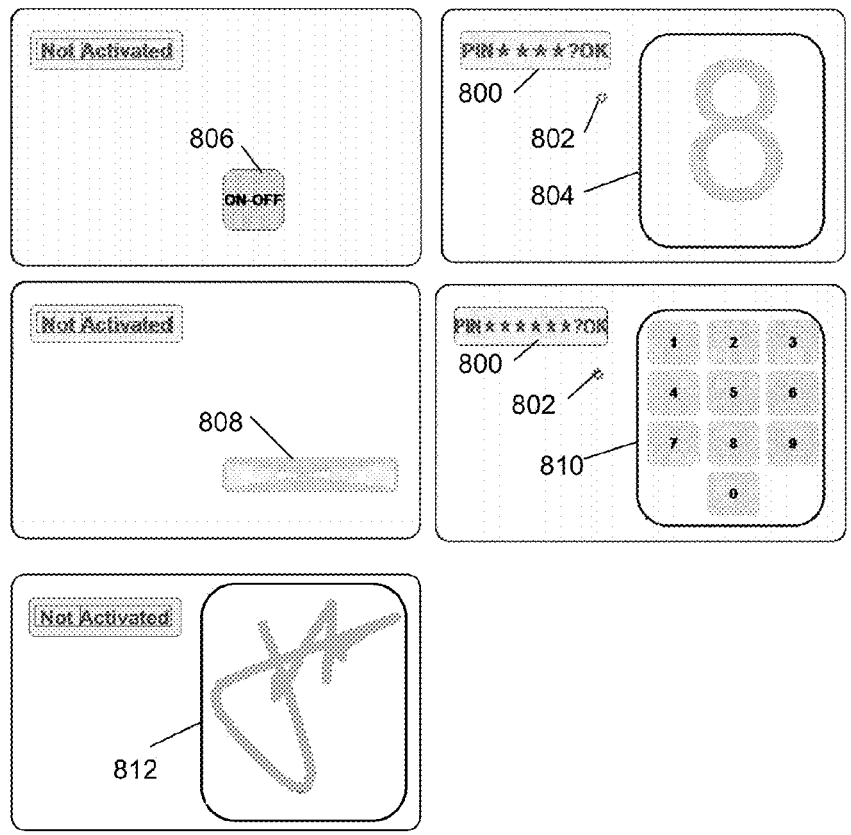
FIG. 8 shows examples of feasible configurations of tactile user interfaces.
FIG. 9 shows an exemplary embodiment of a table wherein configuration inputs are linked to specific configurations of authentication user interfaces.

FIG. 8 shows examples of feasible configurations of tactile user interfaces. For example, the authentication user interface 310 and the tactile data decoding unit 308 may be configured to receive, respectively decode, a handwritten character (804), a button press (806), a swipe (808), a keypad entry (810) or a signature shortcut (812). The authentication user interface 310 and the tactile data decoding unit 308 may also be configured to receive, respectively decode, a complete signature instead of a signature shortcut. In addition, the authentication user interface 310 may be configured to output user feedback via a display (800) and/or a light emitting diode (802).

FIG. 9 shows an exemplary embodiment of a table wherein configuration inputs are linked to specific configurations of authentication user interfaces. If the configuration input prescribes that the authentication user interface 310 shall be enabled, the configuration input may further prescribe more specifically which type of input data shall be supported, i.e. a handwritten character (804), a button press (806), a swipe (808), a keypad entry (810) or a signature shortcut (812). Furthermore, the configuration input may prescribe whether or not a display (800) and/or a light emitting diode (802) shall be activated for user feedback.

For example, the configuration input embodied as "Configuration String 1" prescribes that a signature shortcut 812 (or alternatively a complete signature) shall be supported and that the on-card display 800 shall be activated. The configuration input embodied as "Configuration String 2" prescribes that a swipe 808 shall be supported and that the on-card display 800 shall not be activated. The configuration input embodied as "Configuration String 3" prescribes that a button press 806 shall be supported and that a back channel to the host application (304) shall be activated.

It is noted that the drawings are schematic. In different drawings, similar or identical elements are provided with the same reference signs. Furthermore, it is noted that in an effort to provide a concise description of the exemplary embodiments, implementation details which fail into the customary practice of the skilled person may not have been described. It should be appreciated that in the development of any such implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMBERS 300 smartcard system
302 smartcard
304 host application
306 application user interface selector
308 tactile data decoding unit
310 authentication user interface
312 central server
400 application descriptive data
402 hash sum
500 authentication user interface control unit
502 display
504 tactile user input interface
600 configuration unit
602 reference tactile patterns
604 tactile pattern correlator
800 on-card display
802 light emitting diode
804 UI for handwritten character
806 UI for button press
808 UI for swipe
810 UI for keypad entry
812 UI for signature shortcut

The invention claimed is:

1. A smartcard comprising at least two pre-installed applications and an application user interface selector configured and arranged with circuitry, wherein said application user interface selector is arranged to select and configure a specific authentication user interface corresponding to a specific one of the pre-installed applications in dependence on encoded information, including a hash sum, that uniquely identifies the specific authentication user interface and that is received from a host application.

2. A smartcard as claimed in claim 1, wherein said host application is external to the smartcard.

3. A smartcard as claimed in claim 1, wherein the authentication user interface comprises a tactile data decoding circuit, and wherein said application user interface selector is further arranged to configure said tactile data decoding circuit in dependence on the encoded information received from the host application.

4. A smartcard as claimed in claim 3, wherein the tactile data decoding circuit is arranged to decode tactile pattern data of at least one of the types of a handwritten character, a button press, a swipe, a keypad entry, a signature and a signature shortcut, and wherein the application user interface selector is arranged to configure the tactile data decoding circuit by selecting a specific type of tactile pattern data to be decoded.

5. A smartcard as claimed in claim 1, wherein the authentication user interface comprises a user feedback interface, and wherein said application user interface selector is further arranged to configure said user feedback interface in dependence on the encoded information received from the host application.

6. A smartcard as claimed in claim 5, wherein the user feedback interface comprises at least one of a display and a light emitting diode, and wherein the application user interface selector is arranged to configure the user feedback interface by activating said display and/or said light emitting diode.

7. A smartcard as claimed in claim 5, wherein the user feedback interface comprises a back channel to the host application, and wherein the application user interface selector is arranged to configure the user feedback interface by activating said back channel.

8. A smartcard system comprising: at least two pre-installed applications and an application user interface selector configured and arranged with circuitry to select and configure a specific authentication user interface corresponding to a specific one of the pre-installed applications in dependence on encoded information, including a hash sum, received from a host application; a host device coupled to a smartcard reader; and a smartcard, wherein the host device is arranged to execute said host application, wherein, when being executed by the host device, the host application generates said encoded information, and wherein the host device is arranged to transmit said encoded information to the smart card via the smartcard reader.

9. A smartcard system as claimed in claim 8, wherein the host application is further configured and arranged to generate said encoded information in response to application-specific encoded information received from the smartcard.

10. A smartcard system as claimed in claim 9, wherein the application-specific encoded information received from the smartcard is a hash sum generated by the smartcard by applying a hash function on application descriptive data.

11. A method for configuring a smartcard comprising at least two pre-installed applications and an application user interface selector configured and arranged with circuitry, wherein said application user interface selector selects and configures a specific authentication user interface corresponding to a specific one of the pre-installed applications in dependence on encoded information, including a hash sum, that uniquely identifies the specific authentication user interface and that is received from a host application.

12. A method as claimed in claim 11, wherein said host application is external to the smartcard.

13. A method as claimed in claim 11, wherein a host application generates said encoded information in response to application-specific encoded information received from the smartcard.

* * * * *